United States Patent [19]

Miller

[11] 4,354,924

[45] Oct. 19, 1982

[54] DUAL COMPONENT CHROMIA SILICATE CRACKING CATALYST

[75] Inventor: Stephen J. Miller, San Francisco, Calif.

[73] Assignee: Chevron Research Company, San Francisco, Calif.

[21] Appl. No.: 191,574

[22] Filed: Sep. 29, 1980

Related U.S. Application Data

[63] Continuation-in-part of Ser. No. 160,618, Jun. 25, 1980, abandoned, which is a continuation-in-part of Ser. No. 68,847, Aug. 22, 1979, and Ser. No. 76,891, Sep. 19, 1979.

[51] Int. Cl.$^3$ ............................................. C10G 11/05
[52] U.S. Cl. ..................................... 208/120; 252/458
[58] Field of Search ........................ 208/120, 113–119

[56] References Cited

U.S. PATENT DOCUMENTS

| | | | |
|---|---|---|---|
| 3,748,251 | 7/1973 | Demmel et al. | 208/120 X |
| 3,758,403 | 9/1973 | Rosinski et al. | 208/120 |
| 3,941,871 | 3/1976 | Dwyer et al. | 252/454 X |
| 4,239,654 | 12/1980 | Gladrow et al. | 208/120 X |
| 4,287,048 | 9/1981 | Gladrow et al. | 208/120 |
| 4,299,808 | 11/1981 | Klotz | 423/331 |

FOREIGN PATENT DOCUMENTS 1264545   2/1972   United Kingdom ................ 208/120

*Primary Examiner*—Delbert E. Gantz
*Assistant Examiner*—G. E. Schmitkons
*Attorney, Agent, or Firm*—D. A. Newell; W. H. Hooper; S. H. Roth

[57] ABSTRACT

A process for catalytically cracking a hydrocarbonaceous feedstock employing a dual component catalyst. The process is conducted under catalytic cracking conditions, preferably in a single stage, in the absence of added hydrogen. The dual component catalyst composition comprises a crystalline chromia silicate component and a large pore size crystalline aluminosilicate cracking component.

19 Claims, No Drawings

4,354,924

DUAL COMPONENT CHROMIA SILICATE CRACKING CATALYST

CROSS-REFERENCE TO RELATED APPLICATIONS

This application is a continuation-in-part of my copending application, Ser. No. 160,618, filed June 25, 1980, which is a continuation-in-part of my copending applications Ser. No. 68,847, filed Aug. 22, 1979 and Ser. No. 76,891, filed Sept. 19, 1979 (both now abandoned), the disclosures of which are incorporated by reference herein.

BACKGROUND OF THE INVENTION

1. Field of the Invention

The present invention relates to hydrocarbon processing in general and, more particularly, to catalytic cracking of hydrocarbonaceous feedstocks. Specifically, the present invention relates to a process for catalytically cracking a hydrocarbonaceous feedstock with a dual component catalyst composition comprising an essentially alumina-free crystalline chromia silicate and a large pore size crystalline aluminosilicate cracking component. In a preferred embodiment, the essentially alumina-free crystalline chromia silicate is the crystalline chromia silicate more fully described in my copending application, Ser. No. 160,618, filed June 25, 1980.

2. Brief Description of the Prior Art

Catalytic cracking systems typically employ a fluidized bed or a moving bed of a finely divided particulate catalyst. This cracking catalyst is subjected to continuous cycling between a cracking reaction and a catalyst regeneration system. In a fluidized catalytic cracking (FCC) system, a stream of a hydrocarbonaceous feedstock is generally contacted with fluidized catalyst particles in a reaction zone, usually at a temperature of from about 425°–600° C., or higher. The cracking of the hydrocarbons in the feed generally results in deposition of carbonaceous coke on the catalyst particles and, of course, in the production of lower-molecular-weight hydrocarbons. The hydrocarbons are separated from the catalyst which is stripped of volatiles and passed to the catalyst regenerator where it is contacted with an oxygen-containing gas to burn off the coke. The heat evolved during this coke burnoff heats the catalyst particles and supplies the sensible heat for the cracking reaction. The thus regenerated catalyst is returned to the reaction zone for contacting additional feedstock.

Zeolitic materials, both natural and synthetic, are known to have catalytic activity in various types of hydrocarbon conversion reactions including catalytic cracking. Molecular sieve crystalline zeolites are aluminosilicates comprised of a rigid 3-dimensional framework of $SiO_4$ and $AlO_4$ tetrahedra joined by common oxygen atoms. The inclusion of aluminum atoms in the framework produces a deficiency in electrical charge which must be locally neutralized by the presence of additional positive ions within the structural framework. In natural zeolites, and many of the synthetic zeolites, these ions are normally alkali metal or alkaline earth metal cations which are quite mobile and readily exchanged. The cations occupy channels and interconnected voids provided by the framework geometry. U.S. Pat. No. 3,758,403, to Rosinski et at., the disclosure of which is incorporated by reference herein, describes the ZSM-5-type zeolitic aluminosilicate catalysts and their preparation in detail.

The present invention is related in part to crystalline silicate catalysts which are essentially alumina free. In addition to the chromia silicates which are the subject of my copending U.S. patent application Ser. No. 160,618, filed June 25, 1980, other essentially alumina-free crystalline silicates have been prepared and reported in the literature. U.S. Pat. No. 4,073,865 to Flanigen et al., incorporated by reference herein, discloses various crystalline silica polymorphs and methods for their preparation. U.S. Pat. No. 4,061,724 to Grose et al., incorporated by reference herein, discloses a crystalline silica polymorph called "silicalite" and a method for its preparation. U.S. Pat. No. Re. 29,948 to Dwyer et al., incorporated by reference herein, discloses a crystalline silicate essentially free of Group IIIA metals, a method for its preparation and processes employing the same.

Flanigen et al, Nature, 271, 512–516 (Feb. 9, 1978) discuss the physical and adsorption characteristics of silicalite. Bibby et al., Nature, 280, 664–665 (Aug. 23, 1979) report the preparation of a crystalline silicate denominated "silicalite-2". Finally, Anderson et al., J. Catalysis, 58 114–130 (1979) discuss catalytic reactions and sorption measurements carried out on ZSM-5 and silicalite.

In addition to an essentially alumina-free catalyst component, the catalyst of the present invention also employs a large pore size crystalline aluminosilicate cracking component. Such components are well known. Briefly, a crystalline aluminosilicate cracking component has a uniform pore dimension and a pore size from about 7 to 15 Angstroms. These large pore size cracking components admit both normal and iso-aliphatics and have the capability of acting with respect to substantially all the components of a gas oil feed. Zeolites, including the synthetic faujasites, known as zeolite X and zeolite Y, are particularly desirable. Of course, other large pore size zeolites can be employed.

Combination catalysts have been employed to treat hydrocarbon feedstocks. U.S. Pat. No. 3,686,121 to Kimberlin, Jr. et al discloses a hydrocarbon conversion catalyst comprising at least two crystalline aluminosilicate zeolites having essentially the same crystal structure but having different silica-alumina molar ratios, e.g., mixtures of zeolites X and Y. U.S. Pat. No. 3,748,251 to Demmel et al., discloses a catalyst composition comprising two cracking components, one of which is a ZSM-5-type zeolite. Finally, U.S. Pat. No. 3,847,793 to Schwartz et al., discloses a two-stage combination cracking operation which relies upon a combination of catalyst functions and a dual cracking component catalyst comprising a ZSM-5-type of crystalline aluminosilicate composition.

SUMMARY OF THE INVENTION

The present invention relates to a process for catalytically cracking a hydrocarbonaceous feedstock, preferably in a single stage, in which the feedstock is contacted in a reaction zone under catalytic cracking conditions in the absence of added hydrogen with a dual component catalyst composition. One component of the catalyst is essentially alumina-free, a crystalline chromia silicate having a mole ratio of oxides $SiO_2:Cr_2O_3$ of greater than about 20:1. The other component of the catalyst is a large pore size crystalline aluminosilicate cracking component.

DESCRIPTION OF THE PREFERRED EMBODIMENTS

The present invention is employed in a system for catalytically cracking hydrocarbonaceous feeds. Conventional catalytic cracking feeds typically include a mixture of aliphatic and aromatic hydrocarbons boiling at 221° C. and higher. The same hydrocarbonaceous feeds normally processed in commercial catalytic cracking systems may be processed in a cracking system employing the present invention. Suitable feedstocks include, for example, petroleum distillates or residuals, either virgin or partially refined, e.g., by catalytic hydroprocessing. Thus, conventional gas oil cuts are suitable, as are atmospheric and vacuum residua. So-called synthetic feeds, such as coal oils, bitumen and shale oils, are also suitable. A suitable feed may also include recycled hydrocarbons which have already been subjected to cracking, for example, light, medium and heavy cycle oils.

The cracking conditions employed in accordance with the present invention may be obtained in part by preheating or heat-exchanging the hydrocarbonaceous feed to bring it to a temperature of about 315°–400° C. before introducing it into the cracking zone, but preheating of the feed is not essential. Cracking conditions typically include a temperature of from about 425° C. to about 650° C., preferably 460° C. to 560° C. Cracking conditions also include a pressure in the range from about 0 to about 6 atmospheres, preferably from about 1.5 to about 4 atmospheres. In fluidized catalyst systems, a catalyst-hydrocarbon weight ratio of from about 2 to 15 is usually suitable. The cracking, or reaction, zone may be of conventional design and may use dilute-phase fluidized catalyst contact, riser-type entrained catalyst contact, dense-bed fluidized catalyst contact, countercurrent contact, or a combination thereof, between the feed hydrocarbons and the catalyst. The present invention may also be carried out employing a fixed bed or moving bed, although riser cracking is particularly preferred. In a riser cracking operation, residence or contact times of from about 0.3 to 10 seconds are generally employed although contact times from about 0.3 to 3 seconds are preferred.

The catalyst composition in accordance with the present invention generally includes two components. The first component is an essentially alumina-free crystalline chromia silicate having a pore size which will allow the entry into its internal pore structure of normal aliphatic compounds and slightly branched aliphatic compounds, particularly monomethyl substituted compounds, yet substantially exclude all compounds containing at least a quaternary carbon atom or having a molecular dimension equal to or substantially greater than a quaternary carbon atom.

One such essentially alumina-free crystalline chromia silicate is the crystalline chromia silicate which is the subject of my copending U.S. application, Ser. No. 160,618, filed June 25, 1980 and incorporated by reference herein. As disclosed, these chromia silicates have a silica:chromia ratio, in terms of mole ratios of oxides, greater than about 20:1 and an X-ray diffraction pattern characterized by the diffraction lines of Table 1.

TABLE 1

| d-A | Relative Intensity |
|---|---|
| 11.1 ± 0.2 | v.s. |
| 10.0 ± 0.2 | v.s. |

TABLE 1-continued

| d-A | Relative Intensity |
|---|---|
| 3.85 ± 0.07 | v.s. |
| 3.82 ± 0.07 | s |
| 3.76 ± 0.05 | s |
| 3.72 ± 0.05 | s |

These chromia silicates, hereinafter CZM, have a composition, expressed in the anhydrous state in terms of moles of oxides, which comprises:

$$R_2O:aM_2O:bCr_2O_3:cSiO_2$$

wherein $R_2O$ is a quaternary alkylammonium oxide, preferably tetrapropylammonium oxide, M is an alkali metal selected from the group of alkali metals consisting of lithium, sodium, potassium or mixtures thereof, preferably sodium, a is between 0 and 1.5, c is greater than or equal to 12, and c/b is greater than 20. The ratio c/b will normally range between 20 and 3000, and is preferably in the range of 50 to 1000. This chromia silicate exhibits the random powder X-ray diffraction lines shown in Table 2.

TABLE 2

| Interplanar Spacing d (Angstrom) | 2Θ (Doubled Bragg angle) | Normalized Intensities |
|---|---|---|
| 11.2 ± .2 | 7.90 | 100 |
| 10.05 ± .12 | 8.80 | 70 |
| 9.75 ± .11 | 9.07 | 17 |
| 8.99 ± .09 | 9.84 | 1 |
| 7.44 ± .06 | 11.90 | 1 |
| 6.71 ± .05 | 13.20 | 7 |
| 6.36 ± .05 | 13.92 | 11 |
| 5.99 ± .04 | 14.78 | 14 |
| 5.71 ± .04 | 15.53 | 7 |
| 5.57 ± .04 | 15.91 | 10 |
| 5.36 ± .03 | 16.54 | 3 |
| 5.14 ± .03 | 17.25 | 1 |
| 5.02 ± .03 | 17.65 | 5 |
| 4.98 ± .03 | 17.81 | 5 |
| 4.61 ± .02 | 19.25 | 4 |
| 4.36 ± .02 | 20.37 | 5 |
| 4.25 ± .02 | 20.88 | 8 |
| 4.08 ± .02 | 21.78 | 2 |
| 4.01 ± .02 | 22.18 | 3 |
| 3.86 ± .02 | 23.07 | 52 |
| 3.82 ± .02 | 23.29 | 32 |
| 3.75 ± .02 | 23.73 | 17 |
| 3.72 ± .02 | 23.73 | 26 |
| 3.65 ± .02 | 24.40 | 12 |
| 3.60 ± .01 | 24.76 | 2 |
| 3.48 ± .01 | 25.58 | 2 |
| 3.44 ± .01 | 25.88 | 4 |
| 3.40 ± .01 | 26.24 | 1 |
| 3.35 ± .01 | 26.60 | 3 |
| 3.31 ± .01 | 26.95 | 6 |
| 3.25 ± .01 | 27.43 | 2 |
| 3.05 ± .01 | 29.28 | 4 |
| 2.99 ± .01 | 29.90 | 9 |
| 2.96 ± .01 | 30.22 | 4 |

The X-ray diffraction pattern of these chromia silicates is similar to the patterns exhibited by the ZSM-5-type aluminosilicates.

The X-ray diffraction patterns were obtained by standard diffractometer methods using a copper target X-ray tube, a graphite crystal monochromator set to select the K-alpha doublet radiation of copper, and a proportional counter tube operating to selectively measure the reflected K-alpha doublet radiation. The patterns were recorded with a strip chart recorder and the diffraction peak intensities normalized to a scale of 0 to 100. The interplanar spacings, d (measured in angstroms), corresponding to the recorded diffraction peaks were calculated.

The crystalline chromia silicate is prepared by hydrothermally crystallizing an aqueous reaction mixture containing quaternary alkylammonium oxide, chromium oxide, silica and an oxide of an alkali metal from the group of alkali metals consisting of lithium, sodium, potassium or mixtures thereof, preferably sodium.

The reaction mixture preferably has a composition expressed in terms of moles of oxides, as follows:

$$R_2O:aM_2O:bCr_2O_3:cSiO_2:dH_2O$$

wherein a is greater than 0 but less than 5, c is in the range 1 to 100, the ratio c/b is greater than 12 but less than 800, and d is in the range, 70–500. Preferably, a is in the range 0.05 to 1, c is in the range 2–20, the ratio c/b is in the range 30 to 600 and d is in the range 100 to 300. Hydrothermal crystallization is preferably conducted at a temperature in the range of 100° to 200° C., more preferably at 125° to 175° C., and still more preferably at 150° C. The crystallization is conveniently conducted at the autogenous pressure of the reaction mixture.

The crystalline chromia silicate may also be impregnated with a noble metal to catalyze the oxidation of carbon monoxide. The chromium may itself catalyze the reaction. And since the catalyst component contains essentially no aluminum, its hydrothermal stability should be excellent.

In addition to a crystalline chromia silicate, the present invention employs a large pore crystalline aluminosilicate cracking component which may comprise any of the crystalline aluminosilicates which are suitable for cracking hydrocarbons and which provide a pore size in excess of about 7 Angstroms. Such a cracking component has the structure and capability to act upon substantially all the components usually found in a gas oil feed boiling in the range of from about 250°–600° C. Large pore zeolites of this type are well known and include naturally occurring materials or synthetic faujasite of both the X and Y type as well as zeolite L. Of these materials, zeolite Y is preferred. Particularly preferred are the rare earth exchanged Y-type zeolites and, most particularly, ultrastable Y.

Generally speaking, the large pore cracking component can comprise any porous cracking component such as silica/alumina and, preferably, a crystalline aluminosilicate zeolite component having uniform pore dimensions and a pore size from about 7 to 15 Angstroms. As noted above, the large pore zeolite components admit both normal and iso-aliphatics and, therefore, are capable of acting with respect to the entirety of the hydrocarbonaceous feed.

In a preferred embodiment, the large pore crystalline aluminosilicate cracking component is a crystalline aluminosilicate zeolite which is commonly known as an "ultra-stable" faujasite or Y-type zeolite. These ultra-stable zeolites are well known and conventionally used in various conversion processes. They are described, for example, in U.S. Pat. Nos. 3,133,006; 3,293,192 and 3,402,996, all of which are incorporated by reference herein.

In general, "ultra-stable" refers to a Y-type zeolite which is highly resistant to degradation of crystallinity by high temperatures and steam treatment and is characterized by an $R_2O$ content (where R is Na, K, or any other alkali metal ion) of less than 1 weight percent and a unit cell size less than 24.60 Angstroms (usually in the range of 24.2 to 24.56 Angstroms) and an $SiO_2/Al_2O_3$ mole ratio in the range of 3.5–7 or higher. The ultra-stable form of the Y-type zeolite is obtained primarily by the virtual elimination of the alkali metal ion and is identified both by a smaller unit cell and a lack of alkali metal in the crystal structure.

As is generally known, the ultra-stable form of the Y-type zeolite can be prepared by successively base-exchanging a Y-type zeolite with an aqueous solution of an ammonium salt, such as ammonium nitrate, until the alkali metal content of the Y-type zeolite is reduced to less than about 5 weight percent. The base-exchanged zeolite is then calcined in a steam-containing atmosphere at a temperature of 540° to 760° C. for several hours, cooled and thereafter again successively base-exchanged with an aqueous solution of an ammonium salt until the alkali metal content is reduced to less than 1 weight percent. This is followed by washing and calcining again at a temperature of 425° to 760° C. to produce the ultra-stable zeolite Y. As previously noted, this treatment results in the virtual elimination of the alkali metal content of the original zeolite and unit cell shrinkage.

For use in catalytic cracking, it is often desirable to reduce the initial alkali metal content of any of the crystalline aluminosilicate zeolites by replacing their alkali metal content with other metals or hydrogen-containing components. Typically, the alkali metal content is reduced to less than 10 weight percent, preferably less than 4 weight percent and most preferably less than 2 weight percent. Such alkali metal content reduction is readily accomplished by well known techniques, e.g., ion-exchange. Desirable cations for exchange include calcium, magnesium, ammonium, manganese, lanthanum, cerium and mixtures of the rare earth metals, etc.

The rare earth metal content of the zeolite may range from 0 to 22, preferably 14 to 22, weight percent as oxides based on the weight of the rare earth metal-containing zeolite.

A wide variety of rare earth compounds can be employed as the source of rare earth ions, for example, rare earth chlorides, bromides, iodides, nitrates, acetates, sulfates, formates, and the like. The particular rare earth metal salt or salts employed should, of course, be sufficiently soluble in its fluid medium to provide the requisite rare earth ion transfer. Preferred rare earth metal salts are the chlorides, nitrates, and sulfates. Representative rare earth metals are cerium, lanthanum, praseodymium, neodymium, promethium, samarium, europium, gadolinium, terbium, dysprosium, holmium, erbium, yttrium, thulium, scandium, and lutecium. The salt employed may be the salt of either a single rare earth metal or a mixture of rare earth metals.

As with other exchangeable metal ions, the rare earth metal is preferably incorporated into the crystalline aluminosilicate by ion exchange methods as known in the art. In one such method, an alkali metal crystalline aluminosilicate is base-exchanged by contacting with a 5–10% (wt.) rare earth chloride solution at 54°–88° C. for 2–24 hours, filtering, drying and calcining at about 400°–650° C. for 0.5–2.0 hours in ambient air. The process may be repeated, of course, to achieve higher levels of exchange. Other methods for incorporating one or more rare earth metals into a zeolite are set forth in U.S. Pat. Nos. 3,823,092; 3,609,103; and 3,436,357, which are incorporated by reference herein.

In accordance with the present invention, the dual cracking component catalyst may comprise a physical mixture of separate particles of the two catalyst components, each particle containing a single component. The use of separate particles of different pore sizes may facilitate the optimization of the catalytic cracking process by permitting relatively rapid changes in the ratio of the crystalline chromia silicate component and the large pore size crystalline aluminosilicate cracking component.

The particular proportions of the two components in this system can vary over an extremely wide range, and it has been found that the weight ratio of the chromia silicate component to the large pore size crystalline aluminosilicate cracking component can range from 1:20 to 3:1 and preferably from 1:10 to 1:1.

As noted above, the catalyst in accordance with the present invention may simply comprise a physical mixture of two catalyst components. In another embodiment, a mixture of catalyst particles may be used in which each particle contains only one of the two components. In still another embodiment, the catalyst components may be composited in an inorganic matrix, e.g., pelleted, cast, molded, spray-dried, or otherwise formed into pieces of desired size and shape such as rods, spheres, pellets, etc.

Inorganic porous oxides which may be used as the matrix for compositing the two components of the present catalyst composition include any of the readily available porous materials such as alumina, boria, silica, chromia, magnesia, zirconia, titania, the like, and their mixtures. These materials may also include one or more of the various well known clays such as montmorillonite, kaolin, halloysite, bentonite, attapulgite and the like. Preferably, the inorganic porous oxide comprises one or more of the conventional siliceous varieties containing a major amount of silica and a minor amount of an oxide of at least one metal in Groups II-A, III-A and IV-B of the Periodic Table. Representative materials include silica-alumina, silica-magnesia, silica-zirconia, silica-thoria, silica-titania, silica-alumina-zirconia, magnesia, etc. The most preferred inorganic porous oxide matrix material, however, is silica-alumina.

As is generally known, these matrix or compositing materials are typically prepared from silica hydrogel or hydrosol, which is mixed with alumina to obtain the desired silica-alumina composition. The alumina content is typically from about 5 to 40 weight percent, preferably about 10 to 35 weight percent. Various procedures are described in the literature for making silica-alumina, e.g., U.S. Pat. Nos. 2,908,635 and 2,844,523.

Where an inorganic matrix is utilized, the total amount of catalytic material (of the two or more types) is generally from about 10 to 65 weight percent, preferably 15 to 50 weight percent and most preferably 20 to 40 weight percent based on the total composition.

The following Examples are merely illustrative and are not intended as a limitation on the present invention which is defined by the appended claims.

EXAMPLE I

A reaction solution was prepared by dissolving 47.9 grams of tetrapropylammonium bromide in 35 ml. of water and adding to the solution 7.2 grams of sodium hydroxide dissolved in 30 ml. of water. 8 grams of $Cr(NO_3)_3.9H_2O$ dissolved in 20 ml. of water and 116 grams of Ludox brand (30 weight percent $SiO_2$) silica sol were added to the mixture with rapid stirring. The resulting reaction mixture was autoclaved in an open Teflon bottle at a temperature of 150° C. at autogenous pressure for 48 hours.

After this hydrothermal crystallization, the product crystals were recovered by filtration and washed with water. The crystals were then dried overnight at 121° C. and then calcined for 8 hours at 450° C. After washing with aqueous $NH_4NO_3$, the crystals had a composition in terms of moles of oxide of $0.6\ Na_2O:Cr_2O_3:280SiO_2$ and exhibited the X-ray diffraction pattern shown in Table 2.

EXAMPLE II 2.3 grams of sodium nitrate dissolved in 10 ml of water and 5.5 grams of $Cr(NO_3))_3.9H_2O$ dissolved in 10 ml of water were sequentially added to 100 grams of a 25 weight percent solution of tetrapropylammonium hydroxide with rapid stirring. 80 grams of Ludox brand (30 weight percent $SiO_2$) silica sol were added to the above solution and the total mixture was placed in an autoclave maintained at 144° C. for two days at the solution vapor pressure. The product crystals were filtered from the solution and recovered, exchanged with ammonium nitrate, water-washed, dried at 121° C. overnight, and calcined for 8 hours at 450° C. X-ray analysis revealed the diffraction pattern shown in Table 2 above.

The crystals had a composition expressed in terms of mole oxides as follows:

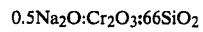

$0.5Na_2O:Cr_2O_3:66SiO_2$

Although the present invention has been described with reference to particular preferred embodiments, it should be understood that obvious modifications will suggest themselves to those of ordinary skill in the art. It is, therefore, the intent that the present invention not be limited by the specific examples but only as defined in the following claims.

What is claimed is:

1. A process for catalytically cracking a hydrocarbonaceous feedstock comprising the step of contacting the feedstock in a reaction zone under catalytic cracking conditions in the absence of added hydrogen with a catalyst composition comprising an essentially alumina-free crystalline chromia silicate component having a mole ratio of oxides of $SiO_2:Cr_2O_3$ of greater than about 20:1 and having the random powder X-ray diffraction lines of Table 1, and a large pore size crystalline aluminosilicate cracking component.

2. The process of claim 1, wherein the large pore size crystalline aluminosilicate cracking component is a Y-type zeolite.

3. The process of claim 1, wherein the large pore size crystalline aluminosilicate cracking component is an ultra-stable Y-type zeolite.

4. The process of claim 1, wherein the crystalline chromia silicate component has a composition expressed in the anhydrous state in terms of moles of oxides comprising:

$R_2O:aM_2O:bCr_2O_3:cSiO_2$ wherein $R_2O$ is a quaternary alkylammonium oxide, M is an alkali metal selected from the group consisting of lithium, sodium, potassium and their mixtures, a is greater than 0 but less than 1.5, c is greater than or equal to 12, and c/b is greater than about 20; said chromia silicate having the random X-ray diffraction pattern of Table 1.

5. The process of claim 1, wherein the catalytic cracking conditions include a temperature of from about 425° to 650° C., a pressure from 0 to about 6 atmospheres, a catalyst hydrocarbon weight ratio of from about 2 to 15, and a contact time of from about 0.3 to 10 seconds.

6. The process of claim 1, wherein the catalyst composition comprises a physical mixture of the two components.

7. The process of claim 1, wherein the two catalyst components are incorporated is an inorganic matrix.

8. The process of claim 7, wherein the total weight of the catalyst components is from about 10 to 65 weight percent of the entire composition.

9. The process of claim 1, wherein the weight ratio of the crystalline chromia silicate component to the crystalline aluminosilicate cracking component is from about 1:20 to 3:1.

10. A process for catalytically cracking a hydrocarbonaceous feedstock comprising the step of contacting the feedstock under catalytic cracking conditions in a reaction zone in the absence of added hydrogen with a catalyst composition comprising an essentially alumina-free crystalline chromia silicate component having an internal pore structure which will allow entry of normal aliphatic and slightly branched aliphatic compounds, yet substantially exclude all compounds having a molecular dimension equal to or substantially greater than a quaternary carbon atom and at least one large pore size crystalline aluminosilicate cracking component.

11. The process of claim 10, wherein the weight ratio of the crystalline chromia silicate component to the crystalline aluminosilicate cracking component is from about 1:20 to 3:1.

12. The process of claim 10, wherein the crystalline chromia silicate component has a mole ratio of oxides $SiO_2Cr_2O_3$ of greater than about 20:1 and the random powder X-ray diffraction lines of Table 1.

13. The process of claim 10, wherein the large pore crystalline aluminosilicate cracking component is a Y-type zeolite.

14. The process of claim 10, wherein the large pore crystalline aluminosilicate cracking component is an ultra-stable Y-type zeolite.

15. The process of claim 10, wherein the catalytic cracking conditions include a temperature of from about 425° to 650° C., a pressure from about 0 to 6 atmospheres, and a contact time in the reaction zone of from about 0.3 to 10 seconds.

16. The process of claim 10, conducted in a single stage with a single feedstock.

17. The process of claim 10, wherein the catalyst composition comprises a physical mixture of the two catalyst components.

18. The process of claim 10, wherein the two catalyst components are incorporated in an inorganic matrix.

19. The process of claim 18, wherein the total weight of the two catalyst components is from about 10 to 65 weight percent of the entire composition.

* * * * *